US009890919B2

(12) United States Patent
Han

(10) Patent No.: US 9,890,919 B2
(45) Date of Patent: Feb. 13, 2018

(54) LAMP LENS WITH REDUCED CHROMATIC ABERRATION AND LAMP FOR VEHICLE USING THE SAME

(71) Applicant: HYUNDAI MOBIS CO., LTD., Seoul (KR)

(72) Inventor: Seong Yeon Han, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 282 days.

(21) Appl. No.: 14/803,555

(22) Filed: Jul. 20, 2015

(65) Prior Publication Data

US 2016/0084464 A1    Mar. 24, 2016

(30) Foreign Application Priority Data

Sep. 22, 2014   (KR) .......................... 10-2014-0125555

(51) Int. Cl.
| | |
|---|---|
| F21S 8/10 | (2006.01) |
| G02B 1/10 | (2015.01) |
| G02B 27/00 | (2006.01) |
| G02B 19/00 | (2006.01) |
| F21V 5/04 | (2006.01) |
| F21V 13/04 | (2006.01) |
| F21Y 115/10 | (2016.01) |

(52) U.S. Cl.
CPC ....... F21S 48/1283 (2013.01); F21S 48/1154 (2013.01); F21S 48/1258 (2013.01); F21V 5/04 (2013.01); F21V 13/04 (2013.01); G02B 1/10 (2013.01); G02B 19/0014 (2013.01); G02B 19/0061 (2013.01); G02B 27/0025 (2013.01); F21Y 2115/10 (2016.08)

(58) Field of Classification Search
CPC .............. F21S 48/4283; F21S 48/1154; F21S 48/1258; F21V 5/04; F21V 13/04; G02B 1/10; G02B 19/0014; G02B 19/0061; G02B 27/0025; F21Y 2115/10
USPC ............................................ 362/510, 311.02
See application file for complete search history.

(56) References Cited

U.S. PATENT DOCUMENTS

| | | | |
|---|---|---|---|
| 4,562,519 | A | 12/1985 | Deves |
| 2005/0225999 | A1 | 10/2005 | Bucher |

(Continued)

FOREIGN PATENT DOCUMENTS

| | | |
|---|---|---|
| JP | 60-62001 A | 4/1985 |
| JP | 2548029 Y2 | 8/1992 |

(Continued)

OTHER PUBLICATIONS

Notice of Allowance dated May 24, 2016 of corresponding Japanese Patent Application No. 2015-139380—3 pages.

*Primary Examiner* — Laura Tso
(74) *Attorney, Agent, or Firm* — Knobbe Martens Olson & Bear LLP

(57) ABSTRACT

The present disclosure relates to a lamp lens with a reduced chromatic aberration, and a lamp for a vehicle using the same. In the lamp lens with a reduced chromatic aberration, a thin film formed of a predetermined material is coated or deposited on a surface of the lamp lens and the thin film is formed within 30% of a diameter of the lamp lens above and below a center of the lamp lens, to increase a reflection of light in a specific wavelength band, thereby efficiently reducing a chromatic aberration.

5 Claims, 6 Drawing Sheets

(56) References Cited

U.S. PATENT DOCUMENTS

| | | | |
|---|---|---|---|
| 2010/0027121 A1* | 2/2010 | Takahara | B29C 41/045 359/570 |
| 2010/0110547 A1* | 5/2010 | Ando | G02B 5/1895 359/570 |
| 2010/0172025 A1* | 7/2010 | Takahara | B29D 11/00865 359/570 |
| 2012/0229754 A1* | 9/2012 | Iyer | G02C 7/083 351/159.4 |

FOREIGN PATENT DOCUMENTS

| | | |
|---|---|---|
| JP | 2007-533080 A | 11/2007 |
| JP | 2009-181845 A | 8/2009 |
| JP | 2009-199938 A | 9/2009 |
| JP | 2013-143361 A | 7/2013 |
| JP | 2014-102984 A | 6/2014 |
| KR | 10-2007-0004088 A | 1/2007 |
| KR | 10-2014-0052645 A | 5/2014 |
| WO | 2009/028686 A1 | 3/2009 |

* cited by examiner

FIG. 8

| MATERIAL | REFRACTIVE INDEX | TRANSMISSIVE RANGE | REMARK |
|---|---|---|---|
| $MgF_2$ | 1.41@250nm<br>1.38@550nm<br>1.36@2.5µm | 160nm~7µm | |
| MgO | 1.73@550nm | 220nm~8µm | |
| $CeO_2$ | 2.25@500nm | 400nm~16µm | |
| $CeF_3$ | 1.70@300nm<br>1.65@400nm<br>1.63@500nm<br>1.62@600nm<br>1.60@1µm | 300nm~5µm | |
| $Al_2O_3$ | 1.64@550nm | 200nm~5µm | |
| $HfO_2$ | 2.15@250nm<br>1.95@500nm | 220nm~12µm | |
| $SiO_2$ | 1.45@550nm | 200nm~9µm | |
| SiO | 1.85@800nm<br>1.6@7µm | 600nm~8µm | |
| Cryorite ($Na_3AlF_6$) | 1.33@500nm | 250nm~2µm | |
| $ZrO_2$ | 2.1@300nm<br>2.05@500nm | 300nm~7.0µm | |
| $TiO_2$ | 2.35@550nm | 400nm~2µm | |
| Sub1 ($TiO_2+ZrO_2$) | 2.1@550nm | 350nm~7µm | |
| $LaF_3$ | 1.58@550nm | 250nm~14µm | |
| $BaF_2$ | 1.48@500nm<br>1.46@2µm | 220nm~15µm | |
| $Y_2O_3$ | 1.75@550nm | 350~8µm | |
| ZnSe | 2.67@550nm<br>2.40@10µm | 600nm~15µm | |
| ZnS | 2.40@550nm<br>2.22@8µm | 400nm~15µm | |

LAMP LENS WITH REDUCED CHROMATIC ABERRATION AND LAMP FOR VEHICLE USING THE SAME

CROSS-REFERENCE TO RELATED APPLICATIONS

This application claims priority to and the benefit of Korean Patent Application No. 10-2014-0125555 filed in the Korean Intellectual Property Office on Sep. 22, 2014, the entire contents of which are incorporated herein by reference.

TECHNICAL FIELD

The present disclosure relates to a lamp lens with a reduced chromatic aberration, and a lamp for a vehicle using the same.

BACKGROUND

In a head lamp for a vehicle configured to form a predetermined light distribution pattern including a light-shadow boundary by light which is forwardly irradiated through a projection lens, such as a projector type head lamp or a direct projector type head lamp, color blurring occurs around the light-shadow boundary due to a chromatic aberration of the projection lens.

Korean Patent Application Laid-Open No. 2014-0052645 and Korean Patent Application Laid-Open No. 2007-0004088 disclose the related technology.

SUMMARY

An aspect of the present invention provides a lamp lens with a reduced chromatic aberration which efficiently reduces the chromatic aberration by coating a thin film formed of a predetermined material on a surface of the lens so that a reflection of component light in accordance with the wavelengths of the light components varies after the light passes through the lens, and a lamp for a vehicle using the same.

An embodiment of the present invention provides a lamp lens with a reduced chromatic aberration, in which a thin film formed of a predetermined material is coated or deposited on a surface of the lamp lens and the thin film is formed within 30% of a diameter of the lamp lens above and below a center of the lamp lens.

The thin film may be coated on one side or both sides of the lamp lens.

A reflection in a predetermined wavelength band may be increased by the thin film.

The thin film may increase a reflection of a blue spectrum and a transmittance of a yellow spectrum.

The thin film may be coated to have a thickness of 100 nm or less.

A single-layered or multi-layered thin film may be coated.

Another embodiment of the present invention provides a lamp for a vehicle including: the lamp lens and an LED light source.

According to the lamp lens with a reduced chromatic aberration according to the embodiment of the present invention, a single-layered or multi-layered thin film formed of a predetermined compound is coated on one surface or both surfaces at a center of the lamp lens, thereby efficiently reducing a chromatic aberration.

That is, a reflection of a light component in a specific wavelength band of light, which is irradiated from a light source to pass through the thin film, is appropriately adjusted through the thin film to reduce a chromatic aberration, and when the lamp lens is applied to a lamp for a vehicle, glaring light to a driver of an oncoming vehicle in an opposite direction is reduced to provide convenience for night time driving and reduce a risk of a car accident.

The effects of the present invention are not limited to the aforementioned effects, and other effects, which are not mentioned above, will be apparently understood by a person skilled in the art from the recitations of the claims.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 8 is an explanatory view of a refractive index with respect to a thin film formed of a predetermined compound and a transmissive range of the light.

Figure 1:
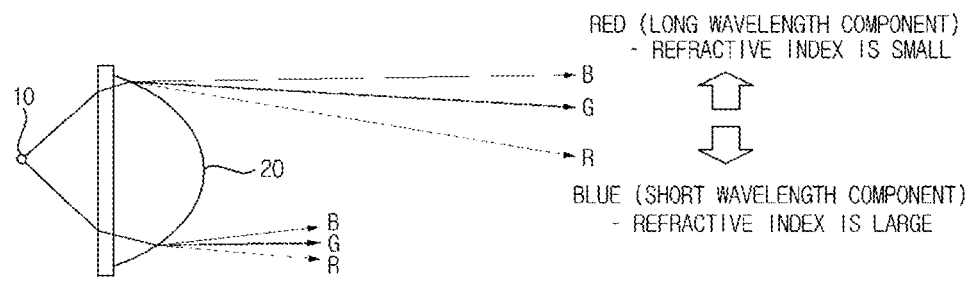
FIG. 1 is a view explaining a chromatic abbreviation of light which passes through a lamp lens.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts embodiments of the present invention throughout the several figures of the drawing.

DETAILED DESCRIPTION

Hereinafter, embodiments of the present invention will be described in detail with reference to the accompanying drawings. First, in denoting reference numerals to constituent elements of respective drawings, it should be noted that the same constituent elements will be designated by the same reference numerals even though they are shown in different drawings. In addition, in the description of the present invention, the detailed descriptions of known related constitutions or functions thereof may be omitted if they make the gist of the present invention unclear. Further, hereinafter, embodiments of the present invention will be described, but it is obvious that the technical spirit of the present invention is not restricted or limited thereto, but the embodiments of the present invention may be modified by a person with ordinary skill in the art to be variously carried out.

As illustrated in FIG. 1, when light irradiated from a light source 10 passes through an upper end and a lower end of a lens 20, light components have different wavelengths and thus have different refractive indexes. Therefore, a red light component RED having a long wavelength has a low refractive index, a blue light component BLUE having a short wavelength has a high refractive index, and a green light component GREEN having an intermediate wavelength has a refractive index between the refractive indexes of the red light component and the blue light component. The light which passes through the upper end and the lower end of the lens causes the color blurring due to the difference in refractive indexes in accordance with the light components.

Figure 2:
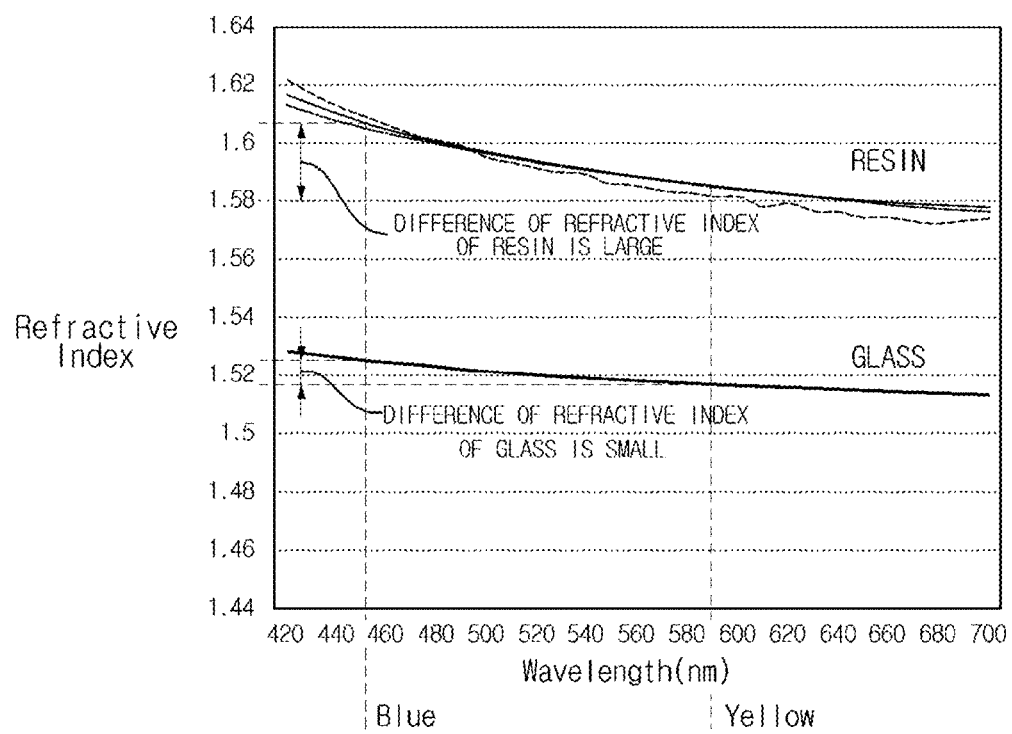
FIG. 2 is a comparison graph of a refractive index with respect to a wavelength of light which passes through a lamp lens when the lamp lens shown in FIG. 1 is formed of a synthetic resin and an optical glass.

Specifically, as illustrated in FIG. 2, in the case of a synthetic resin (plastic) projection lens which is frequently applied in recent years, refraction and dispersion of light are larger than those of a projection lens formed of an optical glass material, so that a color blurring phenomenon caused by the chromatic aberration is severe.

An LED which is used as a light source of a lamp for a vehicle is mainly divided into a blue spectrum and a yellow spectrum, and when the LED light having the above light wavelength characteristic passes through the lens, the chromatic aberration may occur.

The color blurring phenomenon described above emits glaring light to a driver of an oncoming vehicle in an opposite direction at night, which may cause a dangerous situation.

To reduce a chromatic aberration of a lens, a head light for a vehicle with corrected chromatic aberration having a structure formed with a first separation space, which is divided into a convex lens and a concave lens disposed to be adjacent to each other in a lens main body and corrects a chromatic aberration and a spherical aberration by using an aspherical surface design.

Another projector lamp headlight with chromatic aberration correction, comprises: a light source for projecting visible light; a reflector adjacent the light source for directing the light in a generally forward path; an optical lens positioned in the forward path for inverting and manipulating the light into a focused beam pattern; an opaque mask positioned in a portion of the forward path between the lens and the reflector for creating an upper shadow region in the focused beam pattern to shield on-coming traffic, the mask having a top edge establishing a light-shadow boundary in the focused beam pattern; and the mask including a transition region proximate the top edge for passing a limited amount of projected light below the top edge whereby traces of projected light are introduced above the light-shadow boundary in the focused beam pattern so that on-coming traffic is not confronted with abrupt changes in light intensity as the light-shadow boundary crosses into and out of view. Further, a technology in which a micro optic technology is applied to a surface of the lens to relieve the generation of a chromatic aberration may also be suggested. However, in a technology of reducing the chromatic aberration for a vehicle lamp as described above, there is a need for a method in that the structure is simpler and the chromatic aberration is efficiently reduced to provide convenience for night time driving and reduce a risk of a car accident.

In a lamp lens with a reduced chromatic aberration according to an embodiment of the present invention, a thin film formed of a specific material is coated on a surface of the lamp lens to appropriately adjust a reflection of light components when light passes through the lamp lens, thereby reducing the chromatic aberration. Specifically, a reflection of a blue wavelength band having a short wavelength is increased to reduce the chromatic aberration.

That is, a reflection of blue light in an unnecessary wavelength band in the vehicle lamp is increased and transmission of yellow light in a necessary wavelength band is increased to reduce the chromatic aberration.

Figure 3:
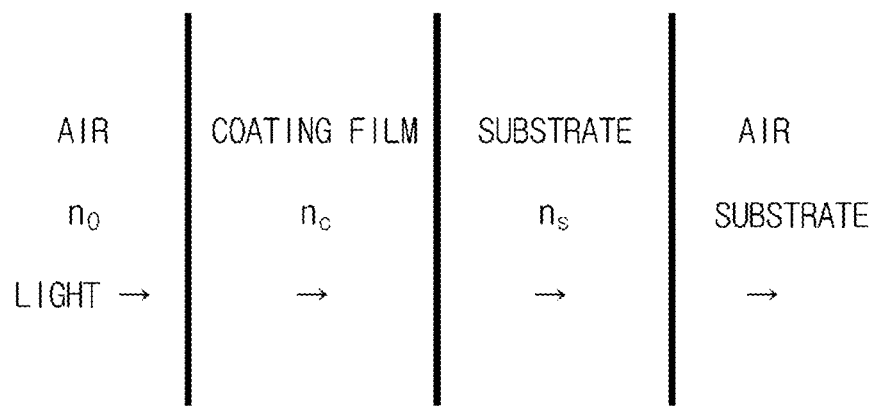
FIG. 3 is a view explaining a refractive index when a thin film is coated on a normal substrate.

Referring to FIG. 3, when a thin film formed of a predetermined material is normally coated on a substrate, a refractive index R may be determined by the following Equation 1.

$$R = (Ns - Nc^2)^2 / (Ns + Nc^2)^2 \qquad \text{Equation 1}$$

Here, Nc is a refractive index of a coating film, and Ns is a refractive index of the substrate.

When a thin film formed of a predetermined material is coated on the lamp lens, in order to adjust a reflection of individual light components of light which passes through the lamp lens, a thickness of the coating film may be determined by the following Equation 2.

$$NcT = \delta/4 \qquad \text{Equation 2}$$

Here, Nc is a refractive index of the coating film, T is a thickness of the coating film, and $\delta$ is a wavelength of light which is reflected at minimum.

In the meantime, a correlation between the refractive index of the coating film and the reflection of the light, which passes through the coating film, is as follows: when the refractive index of the coating film is smaller than a refractive index of the substrate (lens), the reflection is at the minimum in a wavelength of light which satisfies the thickness T of the coating film in Equation 2, and when the refractive index of the coating film is larger than the refractive index of the substrate (lens), the reflection is at the maximum in a wavelength of light which satisfies the thickness T of the coating film in Equation 2.

The reflection in a specific wavelength band of the light which passes through the lens may be easily adjusted using the above principle.

For example, the reflection of light in 450 nm wavelength band may be adjusted to be the maximum, and the reflection of light in 550 nm wavelength band may be adjusted to be the minimum.

Figure 4:
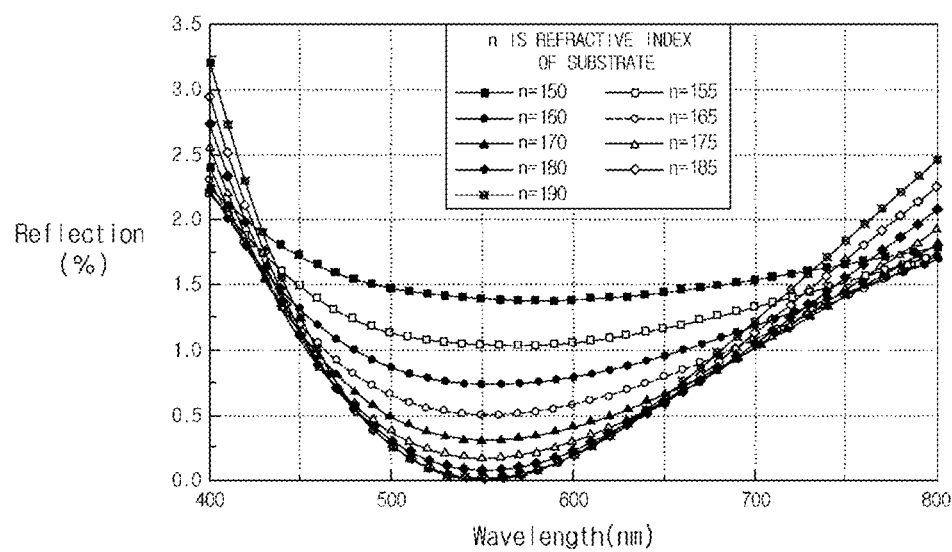
FIG. 4 is a graph explaining a reflection in accordance with a wavelength when a material having a refractive index of 1.38 is coated on a substrate (lamp lens) having various refractive indexes.

FIG. 4 illustrates a correlation of a reflection with respect to refractive indexes n of various substrates when a material having a refractive index of 1.38 is coated on the substrates (lamp lenses).

As the refractive index n of the substrate is low, the difference in reflections in wavelength bands of the light is small, but as the refractive index n of the substrate is increased, the difference in reflections in wavelength bands of the light is increased, and the reflection in the wavelength band of 550 nm is at the minimum.

Figure 5:
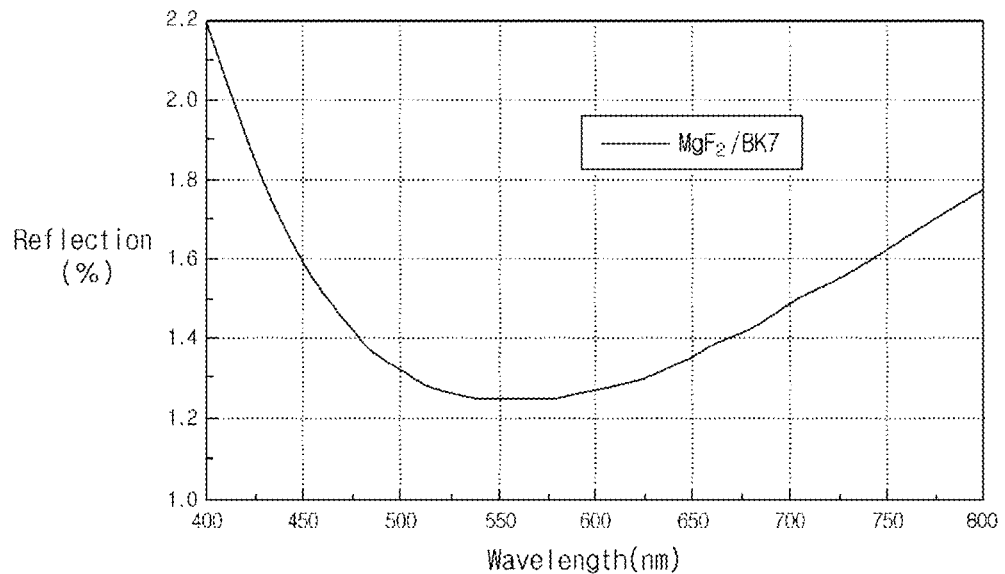
FIG. 5 is a graph of a refractive index with respect to a wavelength of light when magnesium fluoride ($MGF_2$) is coated on an optical glass (BK7) substrate (lamp lens).

FIG. 5 illustrates a correlation of a reflection with respect to a wavelength of light when a lamp lens is manufactured by an optical glass (BK7, n=1.47) and a magnesium fluoride thin film ($MGF_2$, refractive index n=1.38) is coated (deposited) on a surface of the lamp lens, and it can be seen that a reflection of light in a wavelength band of 550 nm is at the minimum.

Figure 6:
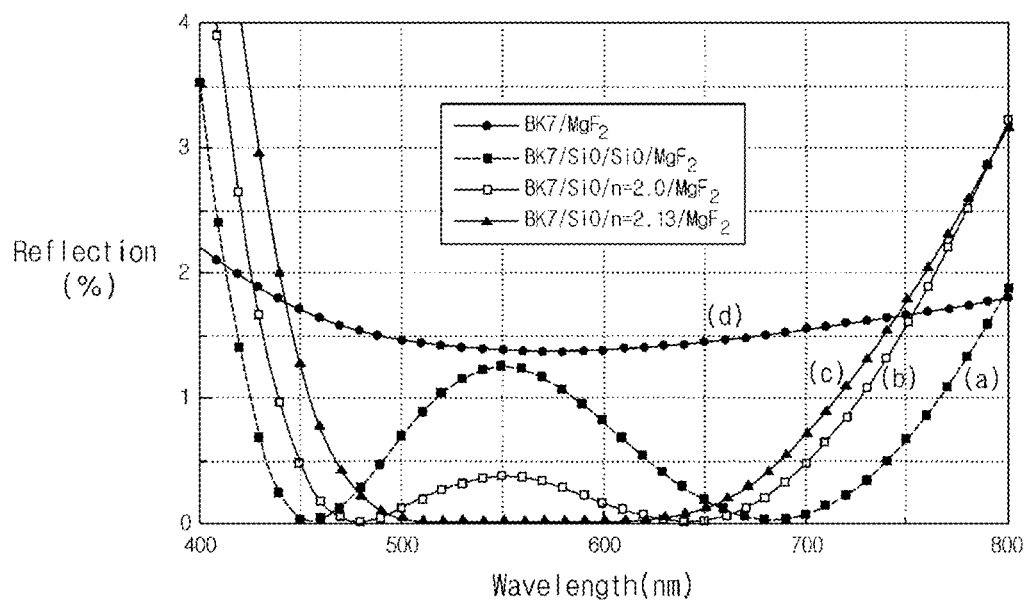
FIG. 6 is a graph of a refractive index with respect to a wavelength of light when three layers of thin films formed of a predetermined compound are coated on an optical glass (BK7) substrate (lamp lens).

FIG. 6 illustrates a correlation of a reflection with respect to a wavelength of light when three layers of thin films (silicon oxide (SiO) and magnesium fluoride ($MGF_2$)) are deposited on the lamp lens formed of an optical glass (BK7), and it can be seen that a reflection is significantly reduced as compared with single-layered thin film coating.

Figure 7:
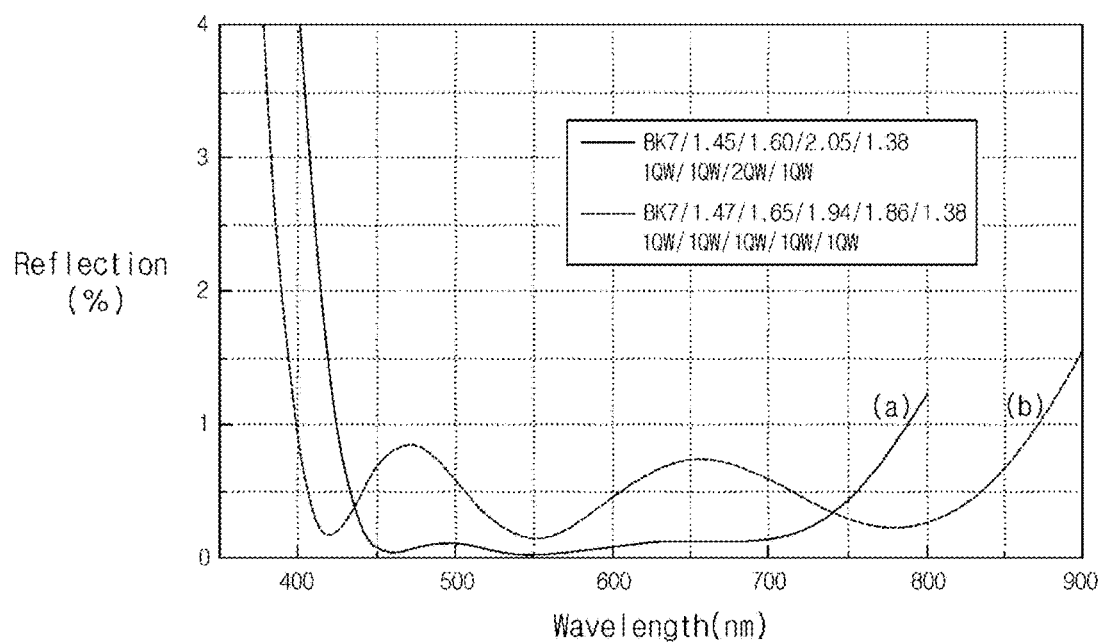
FIG. 7 is a graph of a refractive index with respect to a wavelength of light when four layers of thin films formed of a predetermined compound are coated on an optical glass (BK7) substrate (lamp lens).

FIG. 7 illustrates a correlation of a reflection with respect to a wavelength of light when multilayers (four layers in FIG. 7A and five layers in FIG. 7B) of thin films are coated on a lamp lens, and the reflection in a desired wavelength band may be easily adjusted by alternately coating materials having a large refractive index and a small refractive index.

FIG. 8 illustrates a refractive index of a thin film coating compound and an available transmissive range. An appropriate coating compound may be selected in consideration of the refractive index.

Figure 9:
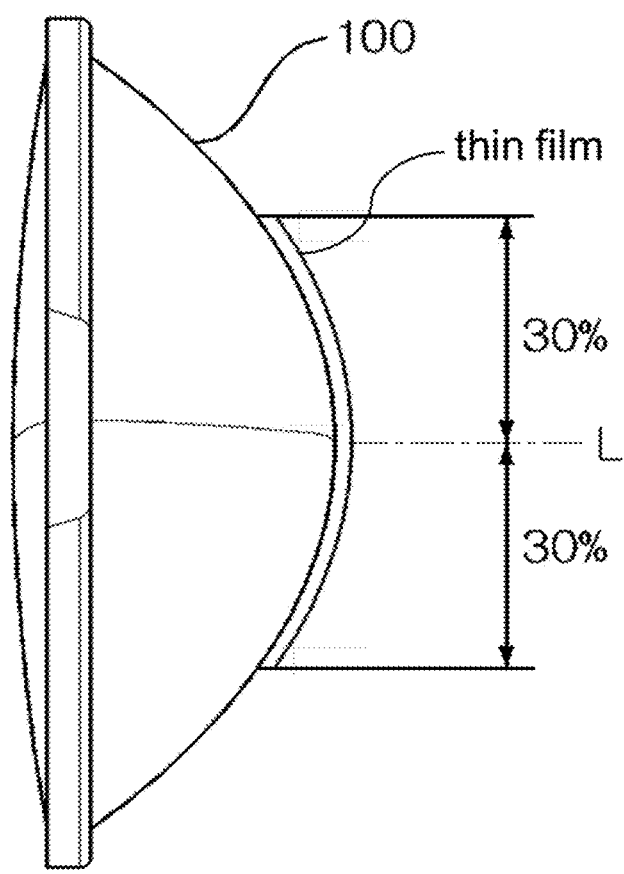
FIG. 9 is a view explaining a thin film coating range of a lamp lens according to an embodiment of the present invention.

Referring to FIG. 9, a single-layered or multi-layered thin film may be coated over 30% (a center of the lamp lens) of a diameter of the lamp lens 100 above and below a center line L, and may be coated on one surface or both surfaces of the lamp lens.

The thin film may be coated to have an appropriate thickness, for example, 100 nm or less.

As described above, the embodiments have been described and illustrated in the drawings and the specification. The embodiments were chosen and described in order to explain certain principles of the invention and their practical application, to thereby enable others skilled in the art to make and utilize various embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A lamp with a reduced chromatic aberration, the lamp comprising:
   a light source;
   a lens placed over the light source and comprising a surface facing away from the light source; and
   a thin film formed on the surface of the lens and in a region within 30% of the diameter of the lens from the center of the lens, wherein the thin film comprises sublayers of silicon oxide (SiO) and magnesium fluoride ($MgF_2$).

2. The lamp of claim 1, wherein the thin film is coated on one side or both sides of the lamp lens.

3. The lamp of claim 1, wherein a reflection in a predetermined wavelength band is increased by the thin film.

4. The lamp of claim 3, wherein the thin film is configured to increase reflection of a blue spectrum and a transmittance of a yellow spectrum.

5. The lamp lens of claim 1, wherein the thin film has a thickness of 100 nm or less.

* * * * *